United States Patent [19]

Snavely, Jr. et al.

[11] 4,348,289
[45] Sep. 7, 1982

[54] WATER TREATMENT METHOD TO REMOVE DISSOLVED OXYGEN THEREFROM

[75] Inventors: Earl S. Snavely, Jr., Arlington, Tex.; Paul L. Caldwell, Jr., Westport, Conn.

[73] Assignee: Mobil Oil Corporation, New York, N.Y.

[21] Appl. No.: 220,327

[22] Filed: Dec. 29, 1980

Related U.S. Application Data

[63] Continuation of Ser. No. 955,548, Oct. 27, 1978, abandoned.

[51] Int. Cl.$^3$ ............................ C02F 1/70; C01B 17/00
[52] U.S. Cl. ................................... 210/749; 423/242; 423/512 A
[58] Field of Search ............... 423/242 A, 242 R, 243, 423/512, 512 A, 219; 210/749; 252/188, 387, 407

[56] References Cited

U.S. PATENT DOCUMENTS

| | | | |
|---|---|---|---|
| 1,271,899 | 7/1918 | Howard | 423/512 A |
| 1,531,993 | 3/1925 | Speller | 252/178 |
| 2,134,996 | 4/1939 | Rawling | 92/21 |
| 2,318,663 | 5/1943 | Bird et al. | 210/33 |
| 2,825,651 | 3/1958 | Looet et al. | 252/188 X |
| 3,169,068 | 2/1965 | Bloch | 252/188 |
| 3,618,667 | 3/1971 | Snavely | 166/310 |
| 3,757,488 | 9/1973 | Austin et al. | 423/243 |
| 3,844,349 | 10/1974 | Snavely et al. | 166/272 |
| 3,918,521 | 11/1975 | Snavely et al. | 423/242 |
| 4,223,735 | 9/1980 | Caldwell et al. | 166/303 |

OTHER PUBLICATIONS

Some Corrosion Inhibitor-A Reference List, pp. 195–197, Corrosion, vol. 1, No. 4, 1955.
The Condensed Chemical Dictionary, 8th ed., 1971, p. 81.
Weeter, Permian Basin Technical Symposium, 3–1968.

*Primary Examiner*—O. R. Vertiz
*Assistant Examiner*—Gregory A. Heller
*Attorney, Agent, or Firm*—C. A. Huggett; M. G. Gilman; J. K. AboKhair

[57] ABSTRACT

This specification discloses a method of treating water which contains oxygen dissolved therein to scavenge the oxygen therefrom and reduce the corrosiveness of the water. A sulfur-containing fuel is burned in a flue gas generator to generate a flue gas containing sulfur oxides and the flue gas is scrubbed with an aqueous sodium hydroxide solution to convert the sulfur oxides to a mixture of sodium sulfite and sodium bisulfite, the mixture being referred to generally as sodium sulfites. Ascorbic acid is included in the reaction to prevent the oxidation of the sodium sulfites to sodium sulfates and the sodium sulfites and ascorbic acid are recovered for use as an additive to scavenge oxygen from water. This additive is injected into an oxygen-containing water in an amount sufficient to scavenge the dissolved oxygen from the water. A catalyst may also be added to the water to catalyze the reaction of the sodium sulfites and oxygen.

7 Claims, 3 Drawing Figures

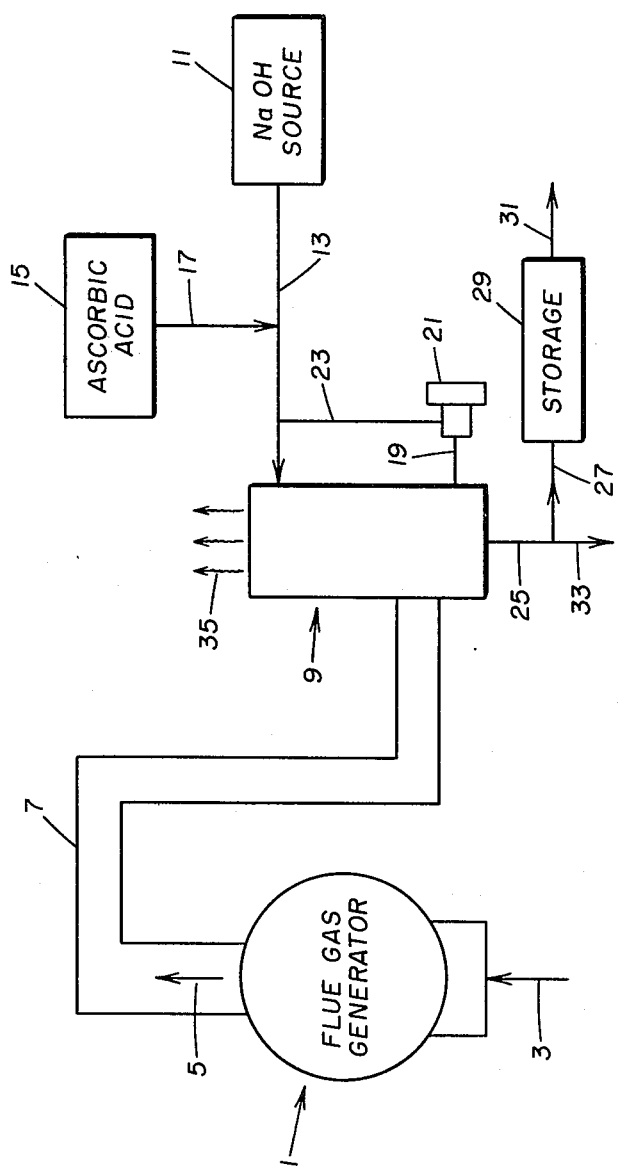
FIG. I

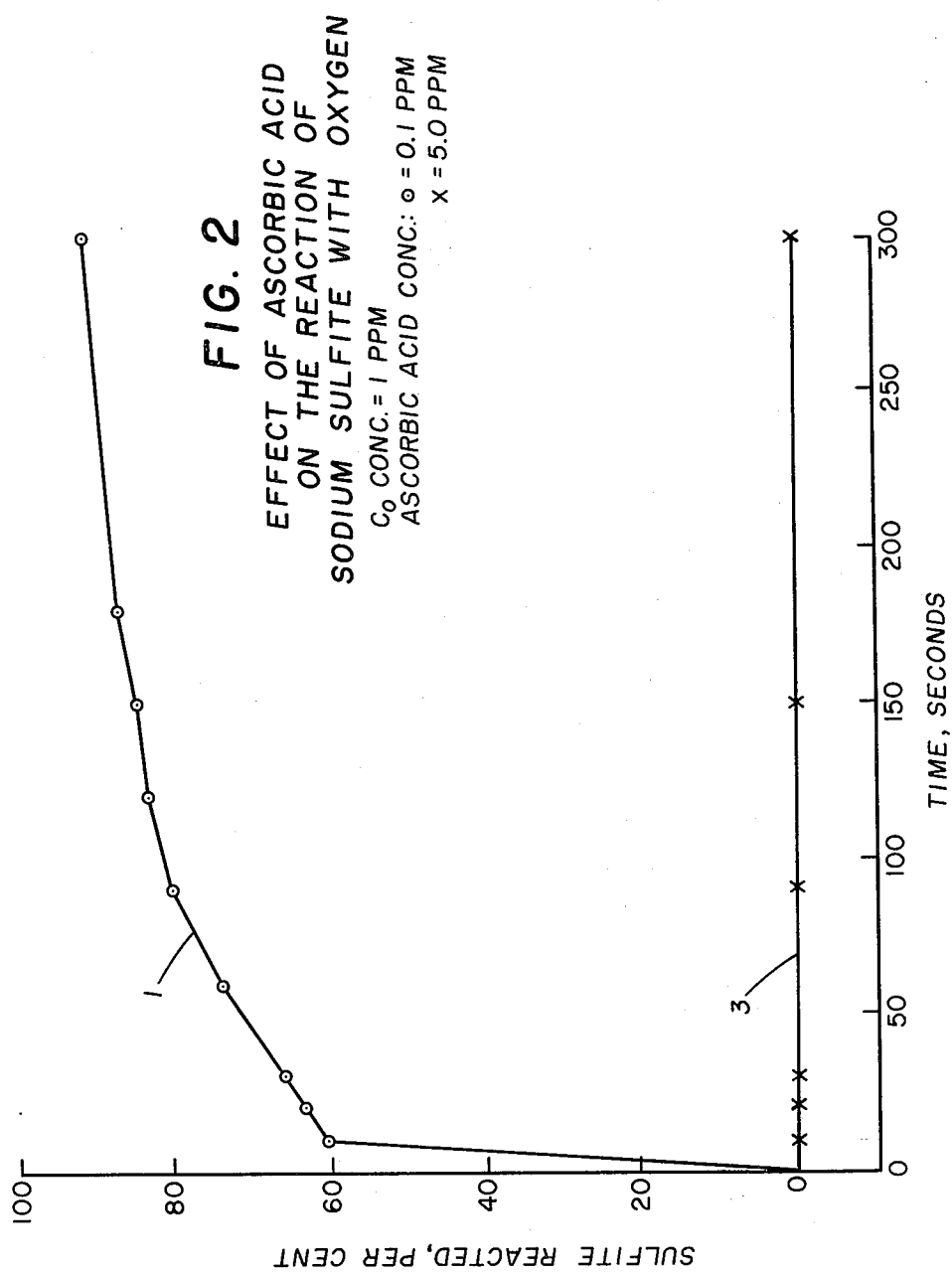

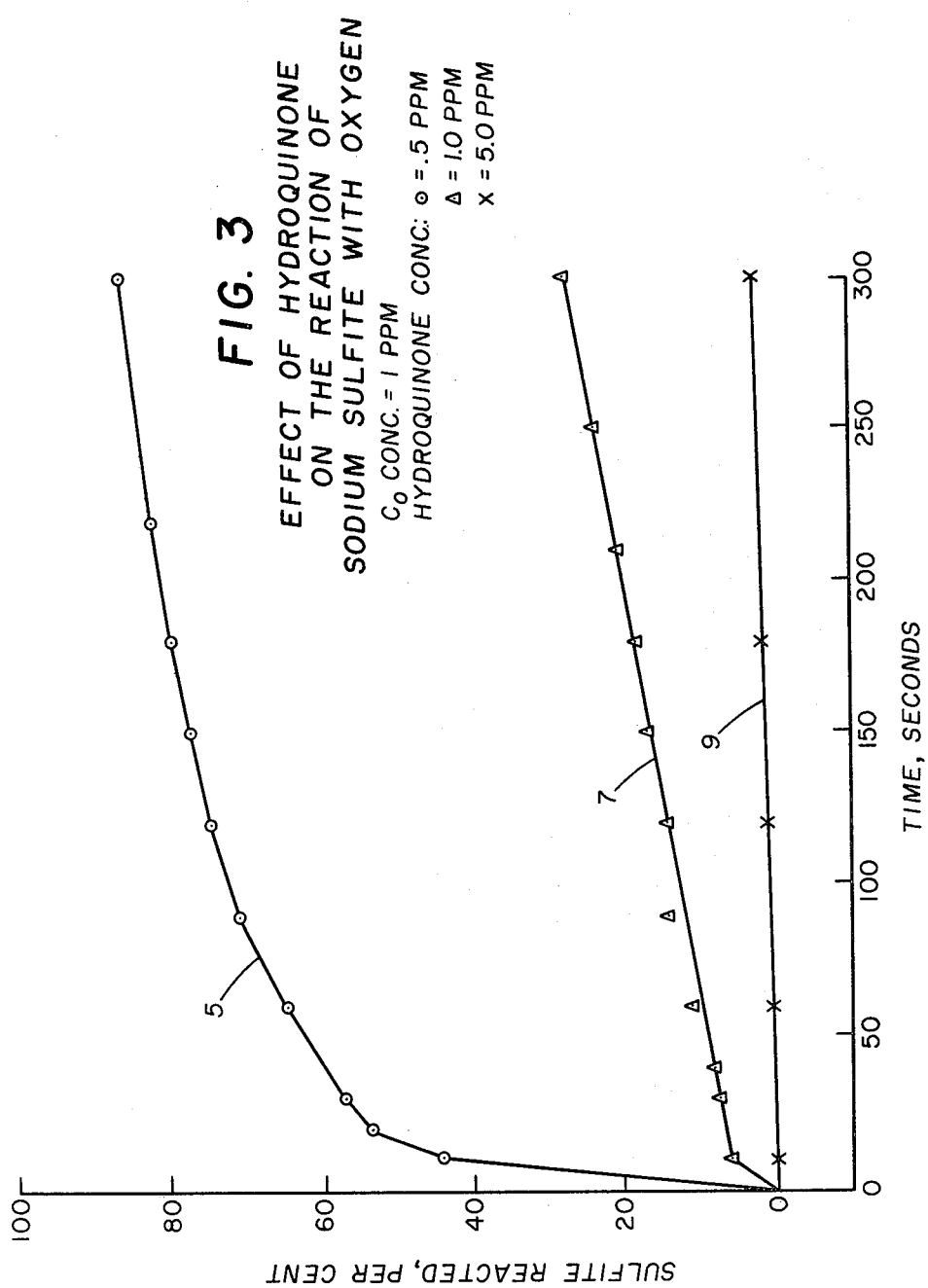

WATER TREATMENT METHOD TO REMOVE DISSOLVED OXYGEN THEREFROM

CROSS-REFERENCE TO RELATED APPLICATIONS

This application is a continuation of application Ser. No. 955,548, filed on Oct. 27, 1978, and now abandoned.

BACKGROUND OF THE INVENTION

This invention relates to the treatment of water containing dissolved oxygen to remove or scavenge the dissolved oxygen and thereby prevent or retard the corrosion of metal contacted by the water.

In oil field practice, corrosion of pipelines, metal tubular members such as casing and tubing installed in wells extending into the earth, boilers and other parts of water distribution systems by oxygen dissolved in water has long been a problem recognized in the art. Techniques of protecting metal from corrosion due to oxygen in water involving the removal of oxygen from the water are discussed by R. F. Weeter in a paper presented at an AIChE Permian Basin Technical Symposium presented at Odessa, Tex., Mar. 25-26, 1968. One method discussed by Weeter of scavenging oxygen from water involves the use of sodium sulfite and a catalyst of divalent metallic ion (usually cobalt). The reaction is $Na_2SO_3 + \frac{1}{2}O_2 \rightarrow Na_2SO_4$. This reaction requires eight pounds of sodium sulfite for each pound of oxygen removed plus an additional 5 to 10 parts per million to drive the reaction to completion. Another method discussed by Weeter of scavenging oxyen from water concerns injecting sulfur dioxide into the water. The reaction is $SO_2 + H_2O + \frac{1}{2}O_2 + H_2SO_4$. This reaction requires four pounds of sulfur dioxide for each pound of oxygen removed and approximately four parts per million additional to drive the reaction to completion.

In U.S. Pat. No. 3,618,667 to Earl S. Snavely, Jr., there is described a method of treating water which contains hydrogen sulfide and oxygen dissolved therein to retard the corrosion of metal in contact with the water by adding a transition metal to the water to catalyze the reaction between the hydrogen sulfide and oxygen and thereby remove the oxygen from the water. In U.S. Pat. No. 1,531,993 to Frank N. Speller, there is described a technique of treating water for use in boilers and the like to absorb free oxygen therefrom by adding a compound that is composed of sodium silicate and sodium sulfite. In U.S. Pat. No. 2,318,663 to Paul G. Bird et al, there is described a method of treating boiler water to prevent caustic embrittlement or intergranular attack of steel boiler plates by adding to the boiler water a combination of chemicals consisting of sodium sulfite or its equivalent and a sulfonated organic substance of suitable colloidal character such as sodium lignin sulfonate that has the property of preventing or retarding oxidation of the sodium sulfite. In U.S. Pat. No. 2,154,996 to Francis G. Rawling, there is described a method of manufacturing paper by treating broke derived from paper containing calcium sulfite as a filler or a coating substance wherein a suitable antioxidant is added to the broke to prevent the conversion of the calcium sulfite to sulfate. Sulfites, such as sodium and barium sulfite, and thiosulfates, such as sodium or potassium thiosulfate, were found to be satisfactory. Glucose, sugar, and tin salts, such as stannous chloride, were also noted as antioxidants.

SUMMARY OF THE INVENTION

This invention is directed to a method of producing an additive for scavenging dissolved oxygen from water. The additive is produced by firing a sulfur-containing fuel in a flue gas generator to generate a flue gas containing sulfur oxides and scrubbing the flue gas with an aqueous sodium hydroxide solution containing ascorbic acid in a reactor vessel to form sodium sulfites and inhibit their oxidation to sodium sulfates. The sodium sulfites and ascorbic acid are recovered for use as an oxygen scavenging additive.

BRIEF DESCRIPTION OF THE DRAWINGS

FIG. 1 is a schematic flow diagram illustrating a system for generating the additive of this invention.

FIG. 2 is a graph showing the effect of ascorbic acid on the reaction of sodium sulfite with oxygen.

FIG. 3 is a graph showing the effect of hydroquinone on the reaction of sodium sulfite with oxygen.

DESCRIPTION OF THE PREFERRED EMBODIMENTS

This invention is directed to a method of producing an additive for scavenging dissolved oxygen from water and to a method of treating waters containing oxygen dissolved therein to scavenge or remove the dissolved oxygen and thereby reduce the corrosiveness of the water to metal.

In U.S. Pat. No. 4,223,735, issued on Sept. 23, 1980, entitled "Petroleum Production Technique Utilizing a Hot Aqueous Fluid" by Paul L. Caldwell, Jr. and Earl S. Snavely, Jr., there is described a method of producing petroleum from a petroleum-bearing formation wherein steam generated in a steam generator fired with a sulfur-containing fuel is injected into a petroleum-bearing formation to assist in producing petroleum therefrom. The flue gas which contains sulfur oxides is scrubbed with alkaline water to remove the sulfur oxides therefrom in a system comprised of a venturi scrubber vessel and an emission scrubber vessel. The sulfur oxides are converted primarily to sodium sulfite and sodium bisulfite, hereafter referred to generally as sodium sulfite or simply sulfates and ascorbic acid, may be included in the scrubbing process to prevent the sulfites from being oxidized to sulfates such that the sulfites and ascorbic acid may be used to treat waters such as the feed water for the steam generator.

In accordance with this invention, there is provided a technique for forming an additive for treating waters containing dissolved oxygen therein to scavenge or remove the dissolved oxygen and thereby reduce the corrosiveness of the water which additive is comprised of sodium sulfite and ascorbic acid. In using the additive for scavenging dissolved oxygen from water, the additive is injected into the water in an amount to provide sufficient sodium sulfite to remove the oxygen from the water but in a sufficiently small amount that the ascorbic acid is sufficiently diluted to render it ineffective to inhibit the reaction of the sodium sulfite with oxygen. A sulfur-containing fuel is burned in a flue gas generator to produce a flue gas containing sulfur oxides and the flue gas is reacted in a reactor vessel with an aqueous sodium hydroxide solution in the presence of ascorbic acid to convert the sulfur oxides to sodium sulfites. At least a portion of the sodium hydroxide solution containing the formed sodium sulfites is recirculated through the reactor vessel until the concentration of the sodium sulfites in the reactor vessel reaches at least about 10 percent by weight and preferably about 10 to 20 percent by weight of the recirculated solution. The sodium sulfites and ascorbic acid are then recovered as an additive for scavenging oxygen.

For a more detailed description of this invention, reference is made to the drawings. In FIG. 1, there is shown a flue gas generator 1. A sulfur-containing fuel is injected via conduit 3 into and fired in the flue gas generator 1 to produce a flue gas that contains sulfur oxides and in particular sulfur dioxides. The flue gas 5 is discharged from the flue gas generator 1 and conducted via a conduit 7 to a reactor vessel 9. An aqueous solution of sodium hydroxide is flowed from a sodium hydroxide source 11 via a conduit 13 and injected into the reactor vessel 9 to react with the sulfur oxides from the flue gas and form sulfites. Ascorbic acid from an ascorbic acid source 15 is injected into the reactor vessel 9 via conduits 17 and 13. The ascorbic acid is added into the reactor vessel 9 in an amount sufficient to inhibit the oxidation of sulfites formed in the reactor vessel to sulfates. A concentration of 1 to 5 parts per million (ppm) in the aqueous sodium hydroxide solution is sufficient to inhibit this oxidation. A conduit 19, pump 21, and conduit 23 are provided for recirculating the aqueous sodium hydroxide solution through the reactor vessel to further react with the sulfur oxides of the flue gas and form sulfites. This recirculation of the aqueous sodium hydroxide solution through the reactor vessel is continued until the sulfite concentration in the reactor vessel reaches a desired concentration. This desired concentration is normally within the range of 10 to 20 weight percent of the recirculated solution. Thereafter, the sulfite solution is withdrawn from the reactor vessel 9 via conduits 25 and 27 and recovered as indicated by storage 29. The sulfite solution may be withdrawn from the storage 29 via conduit 31 as desired. The scrubbed flue gases 35 after reaction with the sodium hydroxide solution are discharged from the reactor vessel 9.

The operation of this system may be conducted as a batch operation, continuous operation, or a combination of the two. When a batch operation is carried out, the sodium hydroxide solution and accumulated sulfites are recirculated via conduit 19, pump 21, and conduit 23 through the reactor vessel 9 to continuously react with the flue gas thereby allowing the sulfites to accumulate in the reactor vessel. When a continuous operation is carried out, a portion of the reacted sodium hydroxide solution and the associated sulfites are discharged from the reactor vessel 9 via conduits 25 and 33 to appropriate storage or disposal (not shown) while a commensurate amount of fresh sodium hydroxide is injected as makeup sodium hydroxide from the sodium hydroxide source 11 via conduit 13 into the reactor vessel 9 while another portion is recirculated through the reactor vessel. The pH of the sodium hydroxide solution of the source 11 should be greater than 7 and desirably may be up to, for example, 13 to 14. Desirably the pH of the sodium hydroxide solution is dropped in the reactor vessel 9 to about 5 to 6.

The concentration of the sulfites in the reactor vessel may be determined, for example, by taking a fluid sample as discharged from the reactor vessel 9 via conduit 25 and testing this sample to determine the sulfites concentration. The sulfites concentration may be determined readily, for example, by taking the density of the sample or titrating the sample.

The reactor vessel 9 may be any suitable vessel for reacting the flue gas with the sodium hydroxide solution. An emission scrubber vessel such as that used in U.S. Pat. No. 3,844,349 to Earl S. Snavely, Jr. and Theodore A. Bertness is suitable for this use. Such vessels commonly have trays therein adapted for bubbling a gas through a liquid flowed counterflow therethrough to provide for contact of the gas with the liquid. Another suitable vessel for use as a reactor vessel is a venturi scrubber. A system which uses a combination of a trayed emission scrubber vessel and a venturi scrubber vessel is described in the before-mentioned U.S. Pat. No. 4,223,735, issued on Sept. 23, 1980.

As before mentioned, the flue gas that is generated by firing the flue gas generator with a sulfur-containing fuel contains sulfur oxides therein. The sulfur oxides are primarily sulfur dioxide when the sulfur-containing fuel is efficiently burned. The reactions which take place when the sulfur oxides are contacted with the sodium hydroxide are hereafter illustrated by reference to the reaction which takes place between the sulfur dioxide and the sodium hydroxide. In scrubbing the flue gas containing sulfur dioxide with sodium hydroxide, the sulfur dioxide reacts initially with sodium hydroxide to form sodium sulfite as indicated by equation (1) below. An excess of sulfur dioxide reacts with sodium hydroxide to form sodium bisulfite as indicated by equation (2) below.

$$SO_2 + 2NaOH \rightarrow Na_2SO_3 + H_2O \tag{1}$$

$$SO_2 + NaOH \rightarrow NaHSO_3 \tag{2}$$

The sodium bisulfite and sodium sulfite will in the absence of an oxidation inhibitor react with oxygen which is usually found in excessive amounts in the flue gas to form sodium bisulfate or sodium sulfate as indicated by equations (3) and (4) below.

$$NaHSO_3 + \tfrac{1}{2}O_2 \rightarrow NaHSO_4 \tag{3}$$

$$Na_2SO_3 + \tfrac{1}{2}O_2 \rightarrow Na_2SO_4 \tag{4}$$

The addition of ascorbic acid in a sufficient amount prevents the oxidation of sodium sulfites including sodium sulfite and sodium bisulfite to sodium sulfates. A concentration of ascorbic acid within the range of about 1 to 5 ppm in the sodium hydroxide solution is sufficient for this purpose. In this regard, reference is made to FIG. 2 where there is shown a plot of sulfite reacted in weight percent of sulfite present versus time for a reaction of sodium sulfite in an aqueous sodium sulfite solution with oxygen. This aqueous sodium sulfite solution contains 50 ppm of sodium sulfite. Oxygen was bubbled through the aqueous sodium sulfite solution at a temperature of 72° F. Cobalt (Co) in a concentration of 1 ppm was added to the sodium sulfite solution as a catalyst to catalyze the reaction of the oxygen with the sulfite. Curve 1 shows that 90 percent of the sulfite reacts and forms sulfate in about four minutes in the presence of 0.1 ppm of ascorbic acid under the test conditions. Curve 3 shows that with an ascorbic acid concentration of 5.0 ppm none of the sulfite reacts. It is to be noted that cobalt ion which is a catalyst for the reaction of sodium sulfite with oxygen is present in these tests. Thus, these tests are more severe than would be the case in the absence of a catalyst.

Tests indicate that ascorbic acid is a preferred oxidation inhibitor to use in accordance with this invention inasmuch as no sulfite reacted with oxygen in the presence of 5 ppm of ascorbic acid and 1 ppm of cobalt. Comparison of the effects of ascorbic acid versus hydroquinone is seen by comparing the plots of FIG. 2 and FIG. 3. FIG. 3 is a plot of data taken under the same conditions as that of FIG. 2 with the exception that hydroquinone was added as an oxidation inhibitor rather than ascorbic acid. In FIG. 3, curve 5 shows the amount of sulfite reacted versus time wherein hydroquinone is added as an oxidation inhibitor in the amount of 0.5 ppm; curve 7 shows the results with the hydroquinone concentration of 1.0 ppm; and curve 9 shows the results with the hydroquinone concentration of 5.0 ppm. The data of FIG. 3 show that some of the sulfite continues to react with oxygen with the hydroquinone concentration of 5.0 ppm in the presence of a cobalt catalyst.

In accordance with an embodiment of this invention, the additive comprised of the sodium sulfite solution containing ascorbic acid that is recovered as indicated at the storage 29 of FIG. 1 is added to water containing dissolved oxygen to remove the oxygen and render the water less corrosive to metal. This additive is injected into a water containing dissolved oxygen in an amount such that the ascorbic acid therein is sufficiently diluted to render it ineffective as an oxidation inhibitor but in an amount such that there is sufficient sodium sulfite to combine with the dissolved oxygen to scavenge the oxygen from the water. In using this additive, the sulfite solution containing ascorbic acid is normally injected into the water such that it is diluted within the range of 100 fold to 1000 fold. As a minimum, the sulfite solution is diluted when added as an oxygen scavenger sufficiently to dilute the ascorbic acid to provide an ascorbic acid concentration of no more than 0.1 ppm, such that the ascorbic acid may be tolerated in the sulfite solution when used as an oxygen scavenger. The diluted sulfite solution containing ascorbic acid in an amount no greater than 0.1 ppm is reactive in water containing dissolved oxygen to remove the oxygen therefrom. A catalyst selected from the transition metal catalysts as identified in the before-mentioned U.S. Pat. No. 3,618,667, may also be added to the water containing dissolved oxygen to render the reaction of the sulfite with the oxygen more effective. Cobalt is a preferred catalyst. Another preferred catalyst is nickel ion at a concentration within the range of 0.05 to 1.0 ppm.

What is claimed is:

1. A method of treating an oxygen-containing water to scavenge the oxygen therefrom and render the water less corrosive, comprising:
    (a) firing a sulfur-containing fuel in a flue gas generator to form a flue gas containing sulfur oxides;
    (b) flowing said flue gas containing sulfur oxides into a reactor vessel;
    (c) flowing an aqueous sodium hydroxide solution into said reactor vessel and into contact with said flue gas to scrub said flue gas and to react said sulfur oxides with said sodium hydroxide and form sodium sulfites and discharging said scrubbed flue gas from said reactor vessel;
    (d) injecting ascorbic acid into said reactor vessel in an amount sufficient to inhibit the oxidation of said sodium sulfites to sodium sulfates;
    (e) discharging from said reactor vessel said reacted sodium hydroxide solution containing said sodium sulfites and ascorbic acid;
    (f) recirculating through said reactor vessel at least a portion of said reacted solution through said reactor vessel to further react with said sulfur oxides;
    (g) recovering said sodium sulfites and ascorbic acid; and
    (h) injecting said recovered sodium sulfites and ascorbic acid into a water containing oxygen in an amount sufficient to scrub the oxygen from the water but in a sufficiently small amount to dilute said ascorbic acid to a concentration of less than about 0.1 ppm.

2. The method of claim 1 further comprising adding a catalyst to said water containing oxygen in an amount sufficient to catalyze the reaction between said sodium sulfites and said oxygen.

3. A method of treating an oxygen-containing water to scavenge the oxygen therefrom and render the water less corrosive, comprising:
    (a) firing a sulfur-containing fuel in a flue gas generator to form a flue gas containing sulfur oxides;
    (b) flowing said flue gas containing sulfur oxides into a reactor vessel;
    (c) flowing an aqueous sodium hydroxide solution into said reactor vessel and into contact with said flue gas to scrub said flue gas and to react said sulfur oxides with said sodium hydroxide and form sodium sulfites and discharging said scrubbed flue gas from said reactor vessel;
    (d) injecting ascorbic acid into said reactor vessel in an amount sufficient to inhibit the oxidation of said sodium sulfites to sodium sulfates;
    (e) discharging from said reactor vessel said reacted sodium hydroxide solution containing said sodium sulfites and ascorbic acid;
    (f) recirculating through said reactor vessel at least a portion of said reacted solution through said reactor vessel to further react with said sulfur oxides;
    (g) continuing step (f) until the concentration of said sodium sulfites in said solution reaches at least about 10 percent by weight;
    (h) recovering said sodium sulfites and ascorbic acid; and
    (i) injecting said recovered sodium sulfites and ascorbic acid into a water containing oxygen in an amount sufficient to scrub the oxygen from the water but in a sufficiently small amount to dilute said ascorbic acid to a concentration of less than about 0.1 ppm.

4. The method of claim 3 further comprising adding a catalyst to said water containing oxygen in an amount sufficient to catalyze the reaction between said sodium sulfites and said oxygen.

5. The method of claim 3 wherein in step (f) the recirculating is continued until said sodium sulfites reach a concentration in said solution within the range of 10 to 20 percent by weight.

6. The method of claim 3 wherein said ascorbic acid is provided in said sodium hydroxide solution in an amount within the range of 1 to 5 ppm.

7. The method of claim 3 wherein the pH of said sodium hydroxide solution that is flowed into said reactor vessel is greater than 7.

* * * * *